(12) United States Patent
Tsuyuki et al.

(10) Patent No.: US 9,255,534 B2
(45) Date of Patent: Feb. 9, 2016

(54) CONTROL DEVICE FOR INTERNAL COMBUSTION ENGINE WITH TURBO-SUPERCHARGER

(75) Inventors: Takeshi Tsuyuki, Hadano (JP); Naozumi Katou, Yokohama (JP); Daisuke Takaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/983,933

(22) PCT Filed: Jan. 31, 2012

(86) PCT No.: PCT/JP2012/052077
§ 371 (c)(1),
(2), (4) Date: Aug. 6, 2013

(87) PCT Pub. No.: WO2012/108296
PCT Pub. Date: Aug. 16, 2012

(65) Prior Publication Data
US 2013/0305713 A1   Nov. 21, 2013

(30) Foreign Application Priority Data

Feb. 7, 2011 (JP) .................................. 2011-024132

(51) Int. Cl.
| | |
|---|---|
| *F01N 3/00* | (2006.01) |
| *F02D 41/02* | (2006.01) |
| *F02D 23/02* | (2006.01) |
| *F02D 41/00* | (2006.01) |
| *F02D 13/02* | (2006.01) |
| *F02B 25/14* | (2006.01) |
| *F02D 41/14* | (2006.01) |

(52) U.S. Cl.
CPC .......... *F02D 41/0235* (2013.01); *F02B 25/145* (2013.01); *F02D 13/0261* (2013.01); *F02D 23/02* (2013.01); *F02D 41/0007* (2013.01); *F02D 41/145* (2013.01); *F02D 41/1462* (2013.01); *F02D 41/1458* (2013.01); *F02D 2041/001* (2013.01); *F02D 2041/1433* (2013.01); *F02D 2200/703* (2013.01); *Y02T 10/144* (2013.01); *Y02T 10/18* (2013.01)

(58) Field of Classification Search
USPC ............... 60/274, 280, 285, 286, 297, 301
See application file for complete search history.

(56) References Cited

U.S. PATENT DOCUMENTS 7,054,734 B2 * 5/2006 Todoroki et al. ............. 701/105
7,665,297 B2 * 2/2010 Suzuki et al. .................. 60/287
(Continued)

FOREIGN PATENT DOCUMENTS

| CN | 101922338 A | 12/2010 |
|---|---|---|
| JP | 3-111632 A | 5/1991 |

(Continued)

*Primary Examiner* — Binh Q Tran
(74) *Attorney, Agent, or Firm* — Foley & Lardner LLP

(57) ABSTRACT

A control device for an internal combustion engine with a turbo-supercharger including a variable valve mechanism at least at either one of an intake side and an exhaust side includes a scavenging amount setting means for determining an upper limit value of a scavenging amount moving from an intake passage to an exhaust passage across the interior of a cylinder during a valve overlap period to satisfy a performance requirement for the internal combustion engine, and a variable valve control means for controlling the duration of the valve overlap period according to the scavenging amount.

10 Claims, 11 Drawing Sheets

(56) References Cited

U.S. PATENT DOCUMENTS

| | | | |
|---|---|---|---|
| 8,135,535 B2 * | 3/2012 | Karnik et al. | 701/102 |
| 8,191,354 B2 * | 6/2012 | Cavataio et al. | 60/280 |
| 8,364,376 B2 * | 1/2013 | Wang et al. | 701/102 |
| 8,596,062 B2 * | 12/2013 | Kogo | 60/602 |
| 2008/0077304 A1 | 3/2008 | Suzuki et al. | |
| 2010/0312451 A1 | 12/2010 | Karnik et al. | |

FOREIGN PATENT DOCUMENTS

| | | |
|---|---|---|
| JP | 10-274069 A | 10/1998 |
| JP | 2006-283636 A | 10/2006 |
| JP | 2008-075549 A | 4/2008 |
| JP | 2009-197759 A | 9/2009 |
| JP | 2010-249002 A | 11/2010 |

* cited by examiner

CONTROL DEVICE FOR INTERNAL COMBUSTION ENGINE WITH TURBO-SUPERCHARGER

TECHNICAL FIELD

This invention relates to a control for an internal combustion engine with a variable valve mechanism and a turbo-supercharger.

BACKGROUND ART

A technology is known which provides a valve overlap period by controlling a variable valve mechanism and increases the amount of fresh air in a cylinder by scavenging gas remaining in the cylinder to an exhaust passage utilizing a differential pressure between an intake pressure and an exhaust pressure during this valve overlap period.

For example, JP2006-283636A discloses a technology which obtains a scavenging effect by controlling a throttle valve opening to make an intake pressure higher than an exhaust pressure during a valve overlap period.

SUMMARY OF INVENTION

A scavenging amount during a valve overlap period differs depending on an operating state and an operating environment of an internal combustion engine even if the duration of the valve overlap period is the same. Particularly, in the case of including a turbo-supercharger, an exhaust pressure differs between a steady state where the rotation speed of the supercharger is constant and a transient state where the rotation speed increases. Thus, the scavenging amount differs even if the operating state such as an engine rotation speed and a load is the same and the duration of the valve overlap period is the same.

Accordingly, if the valve overlap period is controlled by searching a map in which valve overlap periods are allotted to engine rotation speeds and loads as disclosed in JP2006-283636A, a scavenging amount suitable for the operating state and the operating environment is not necessarily obtained.

Thus, the present invention aims to obtain a scavenging amount suitable for an operating state and an operating environment also in an internal combustion engine with a turbo-supercharger.

Details, other features and advantages of this invention are described in the following description and shown in the accompanying drawings.

FIG. is a chart showing a stroke sequence of an in-line four cylinder internal combustion engine.

Figure 3:
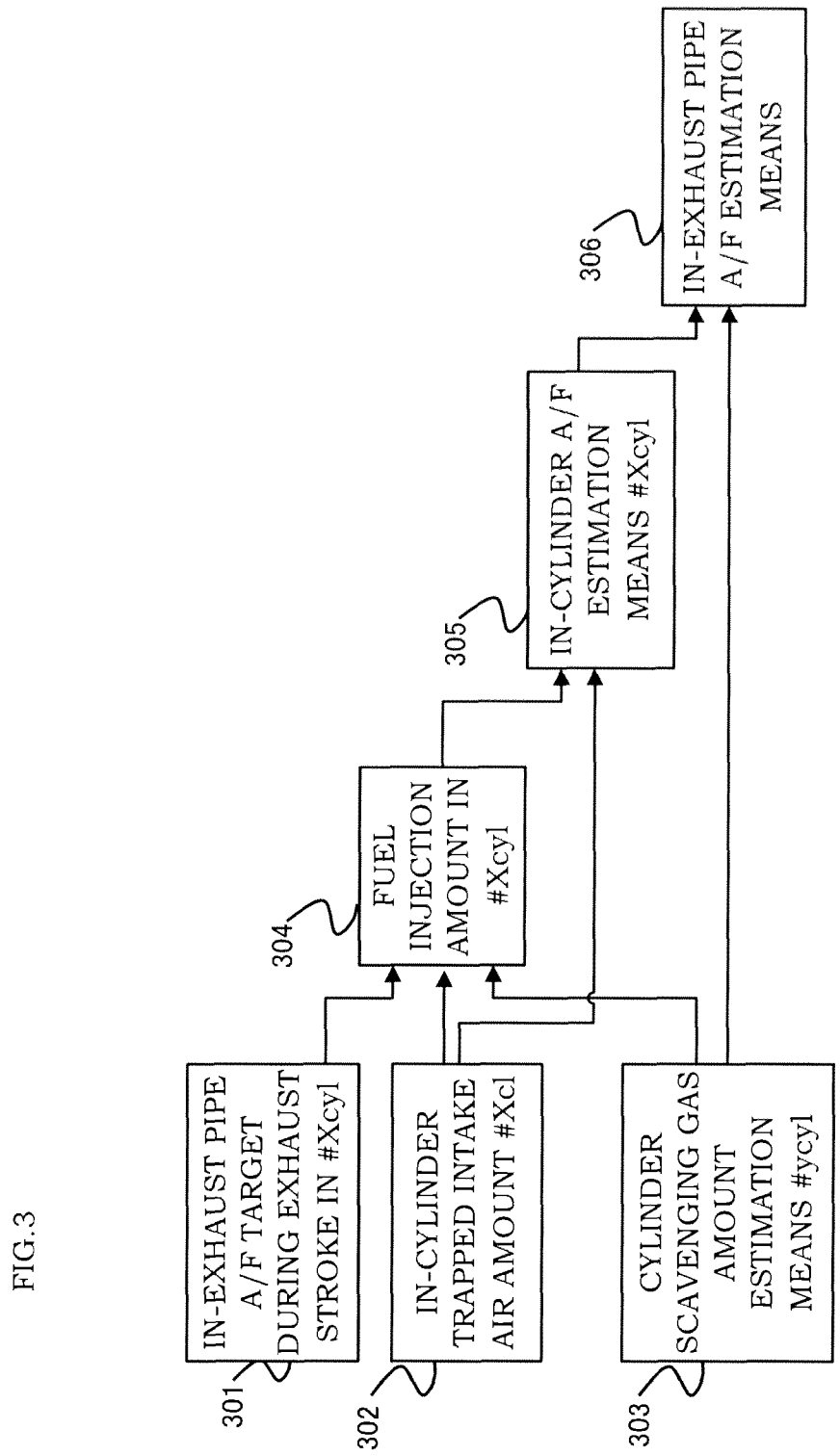

FIG. 3 is a block diagram showing computation contents performed by a control unit for setting a fuel injection amount.

Figure 4:
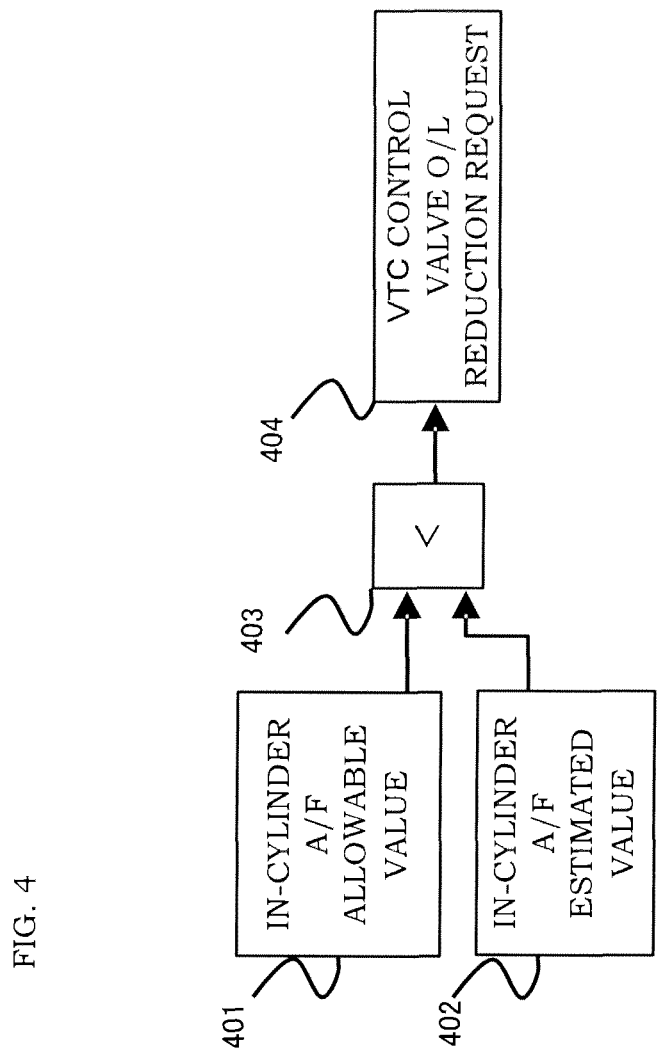

FIG. 4 is a block diagram of a control performed by the control unit for judging whether or not to reduce a valve overlap period.

Figure 5:
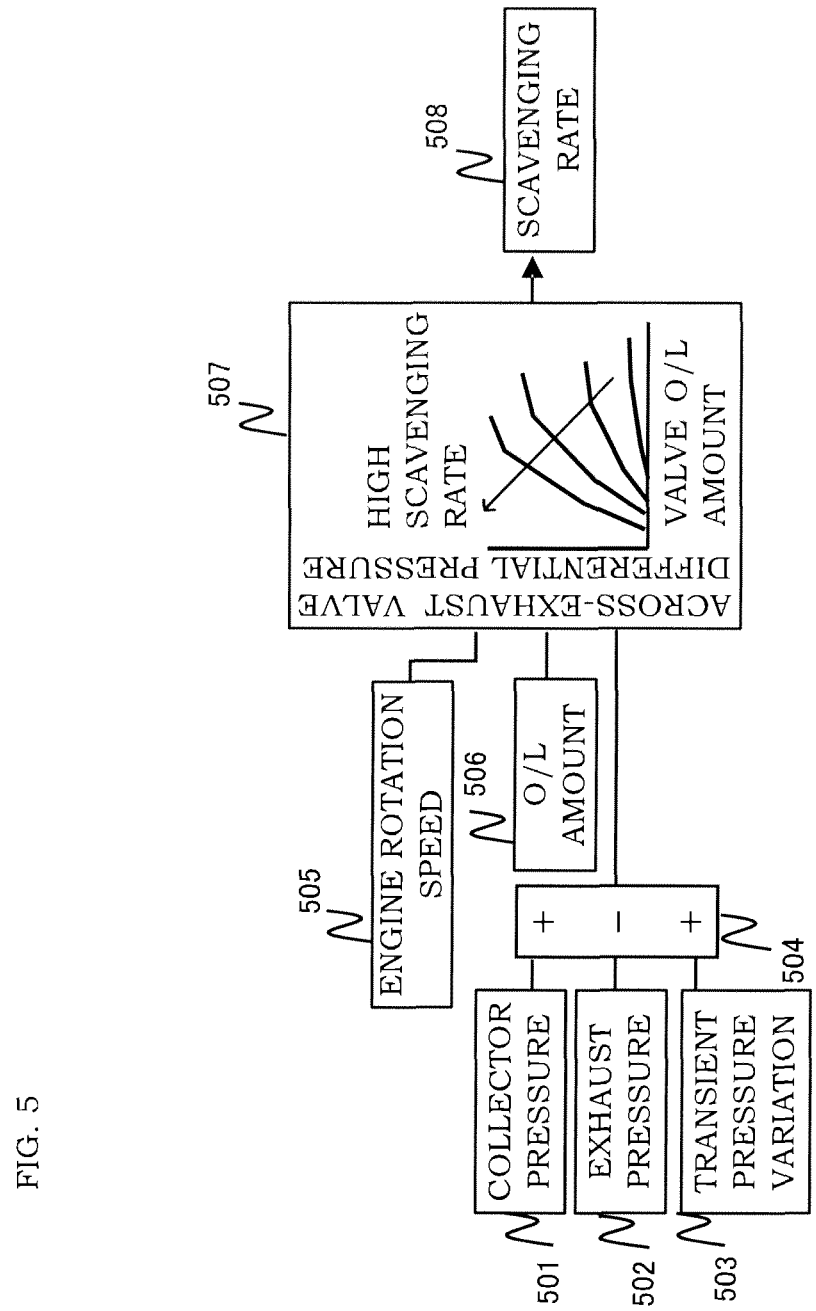

FIG. 5 is a block diagram showing computation contents performed by the control unit for obtaining a scavenging rate.

Figure 6:
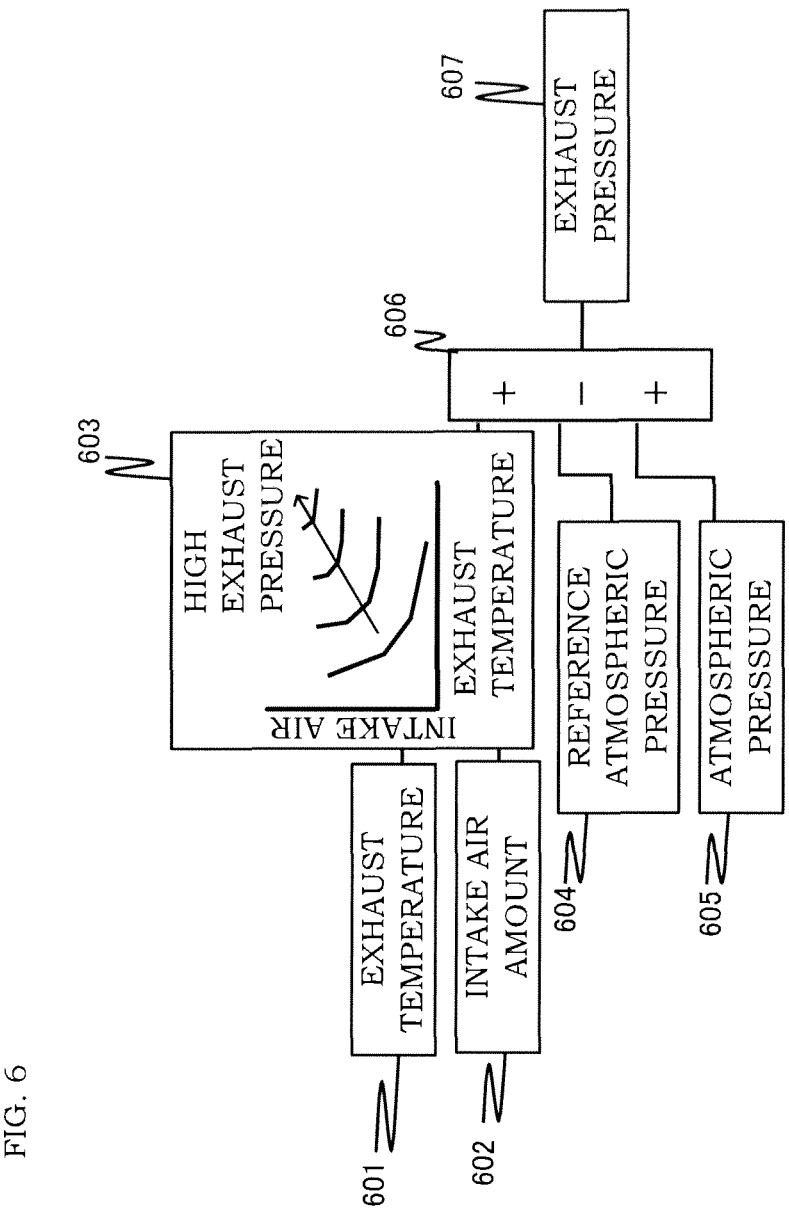

FIG. 6 is a block diagram showing computation contents performed by the control unit for obtaining an exhaust pressure.

Figure 7:
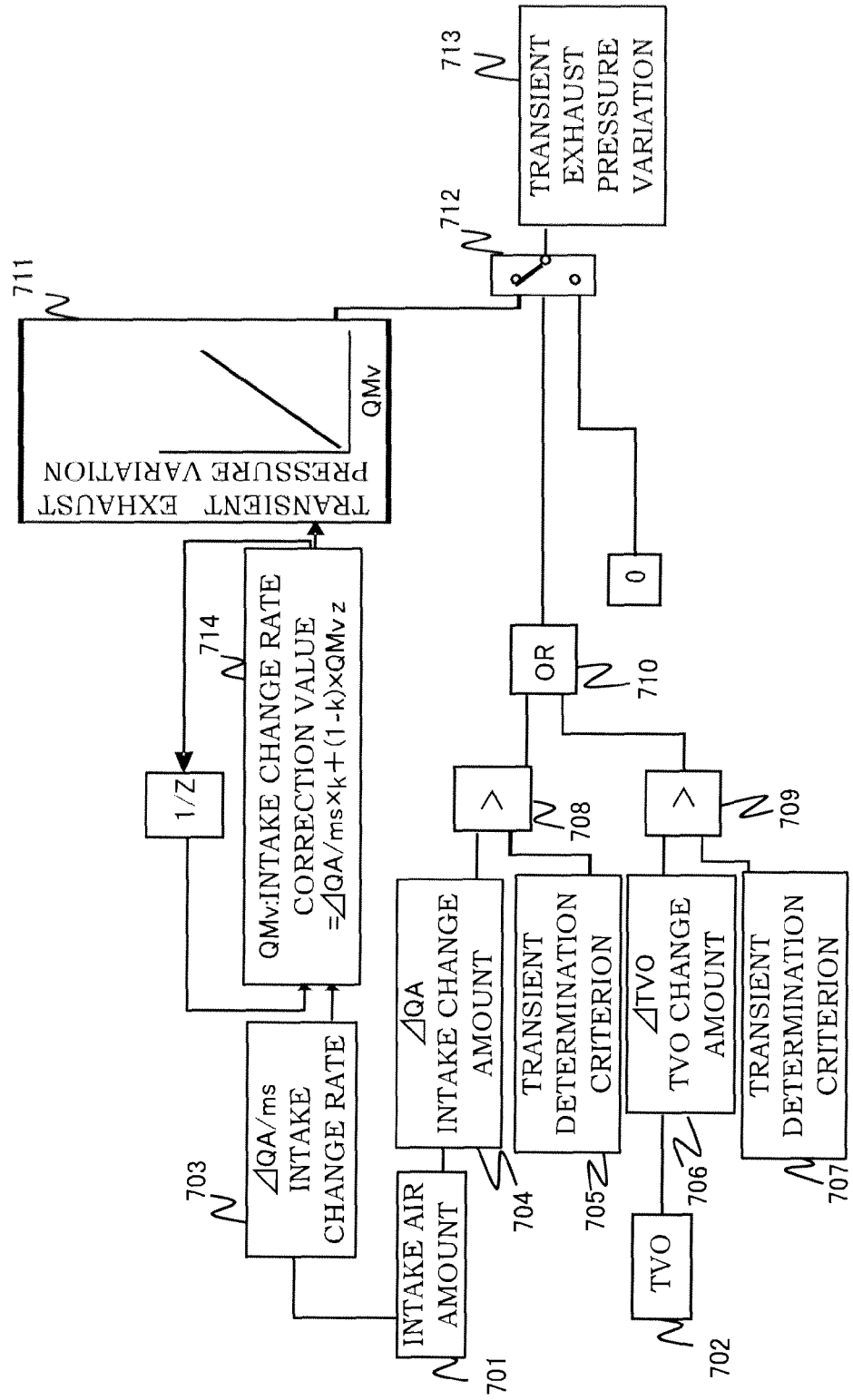

FIG. 7 is a block diagram showing computation contents performed by the control unit for obtaining a transient exhaust pressure variation.

Figure 8:
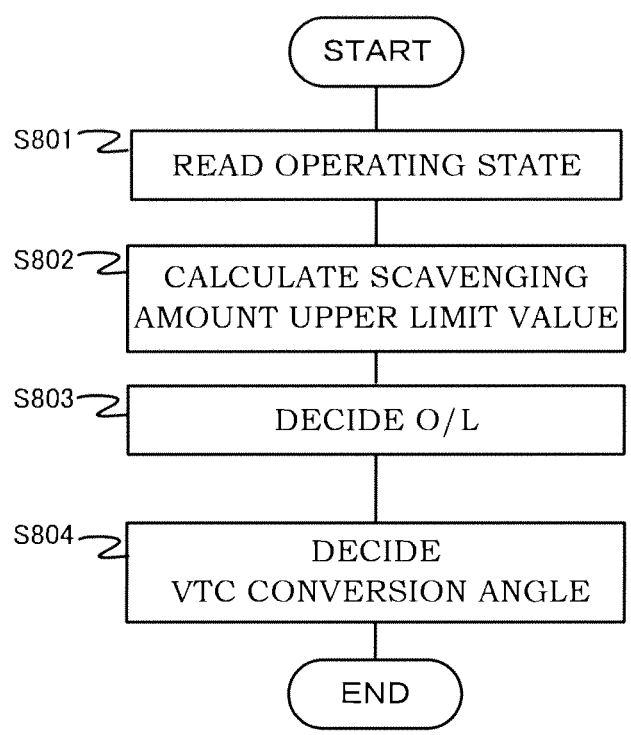

FIG. 8 is a flow chart showing computation contents performed by the control unit for determining a conversion angle of a variable valve mechanism.

Figure 9:
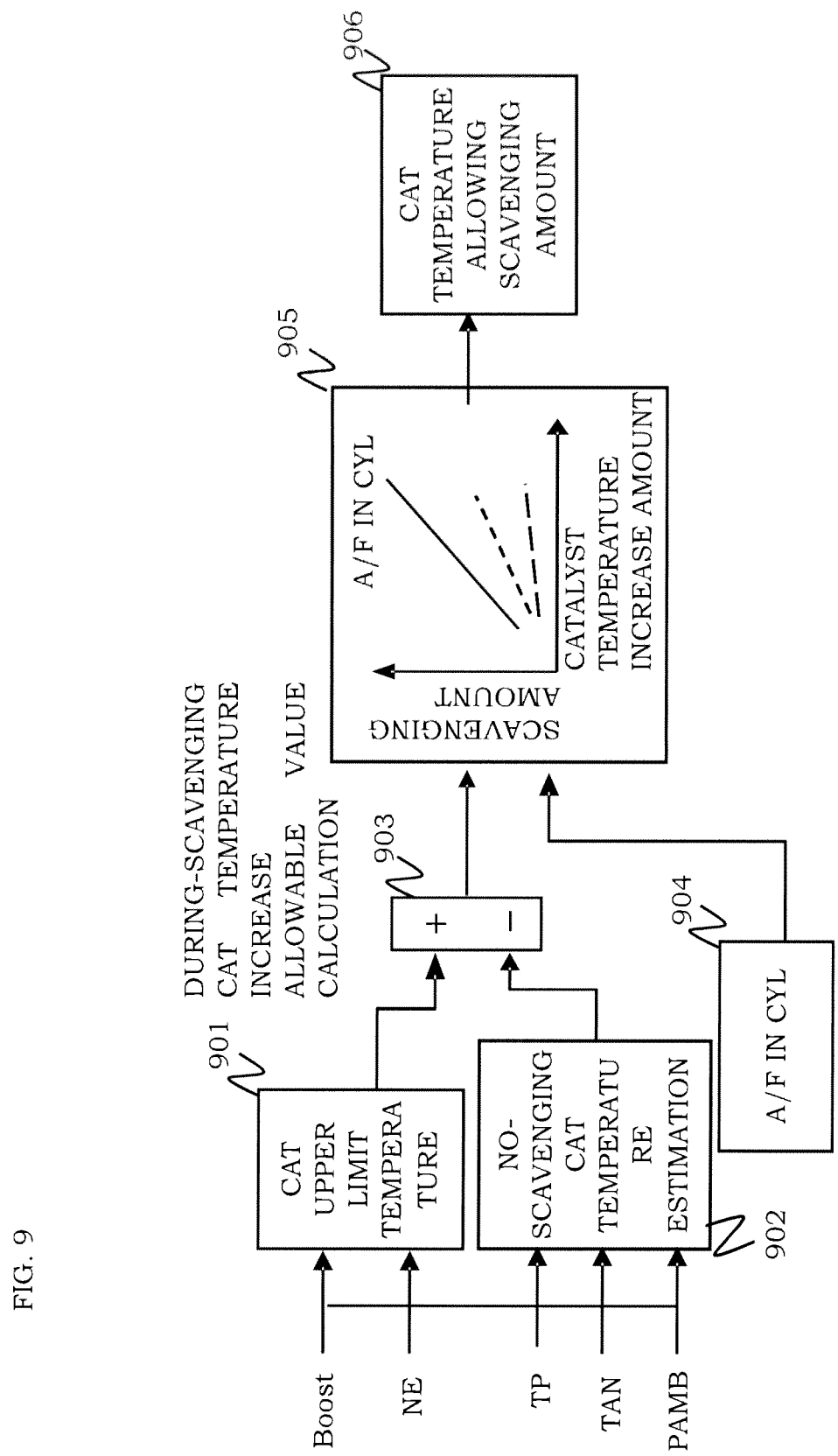

FIG. 9 is a block diagram for the calculation of a scavenging amount upper limit value based on a catalyst temperature, which is performed by the control unit.

Figure 10:
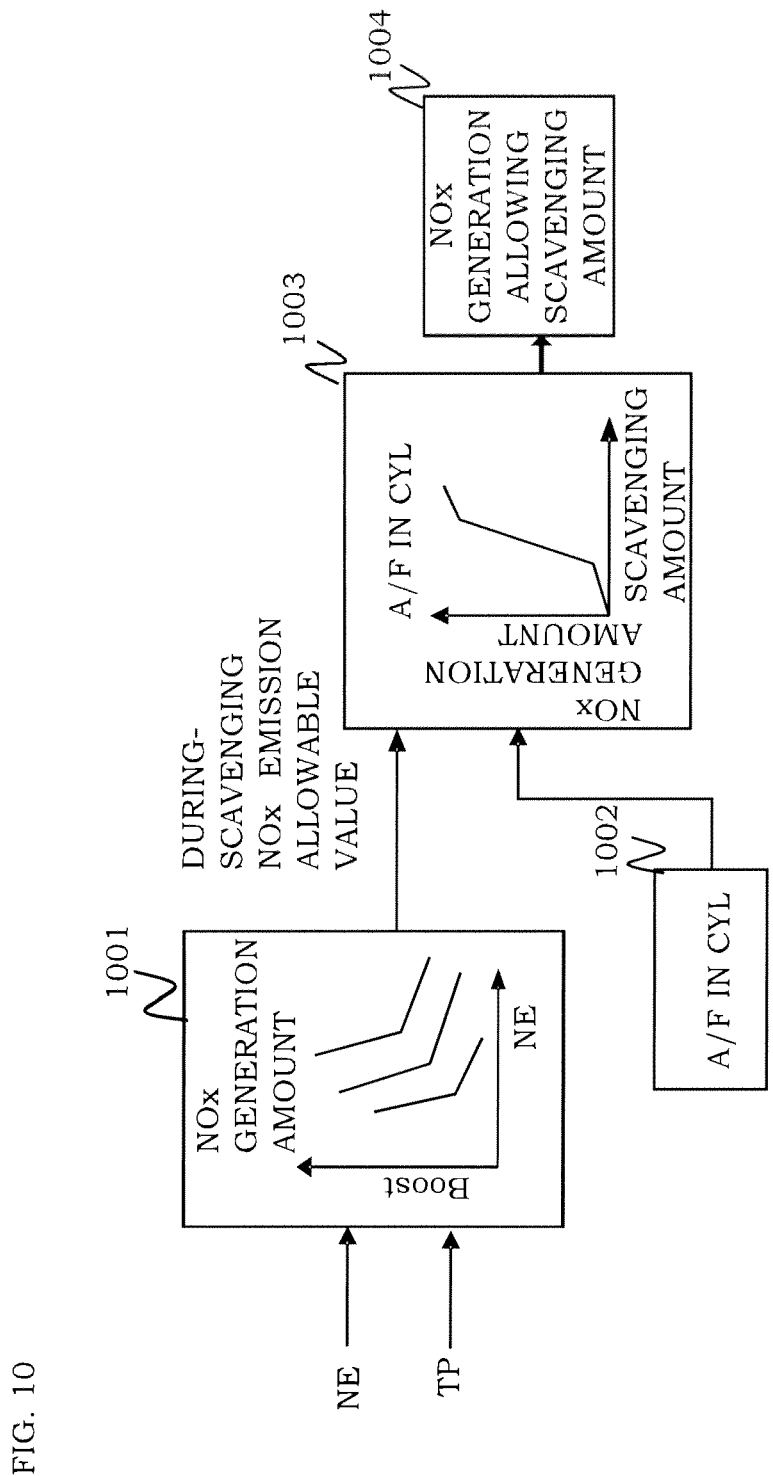

FIG. 10 is a block diagram for the calculation of the scavenging amount upper limit value based on a NOx emission amount, which is performed by the control unit.

Figure 11:
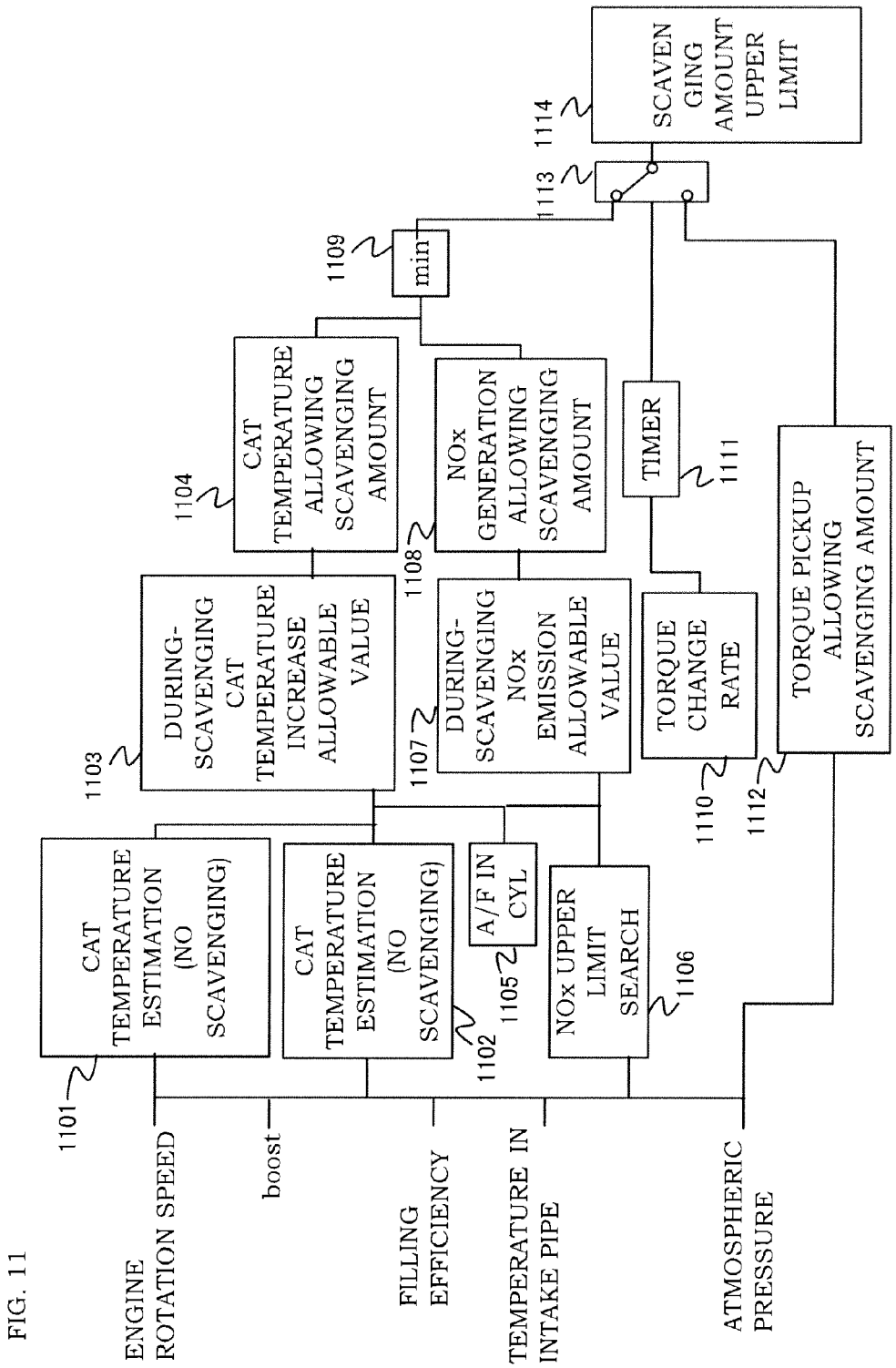

FIG. 11 is a block diagram for the calculation of the scavenging amount upper limit value when a torque suddenly changes, which is performed by the control unit.

DESCRIPTION OF EMBODIMENTS (First Embodiment)

Figure 1:
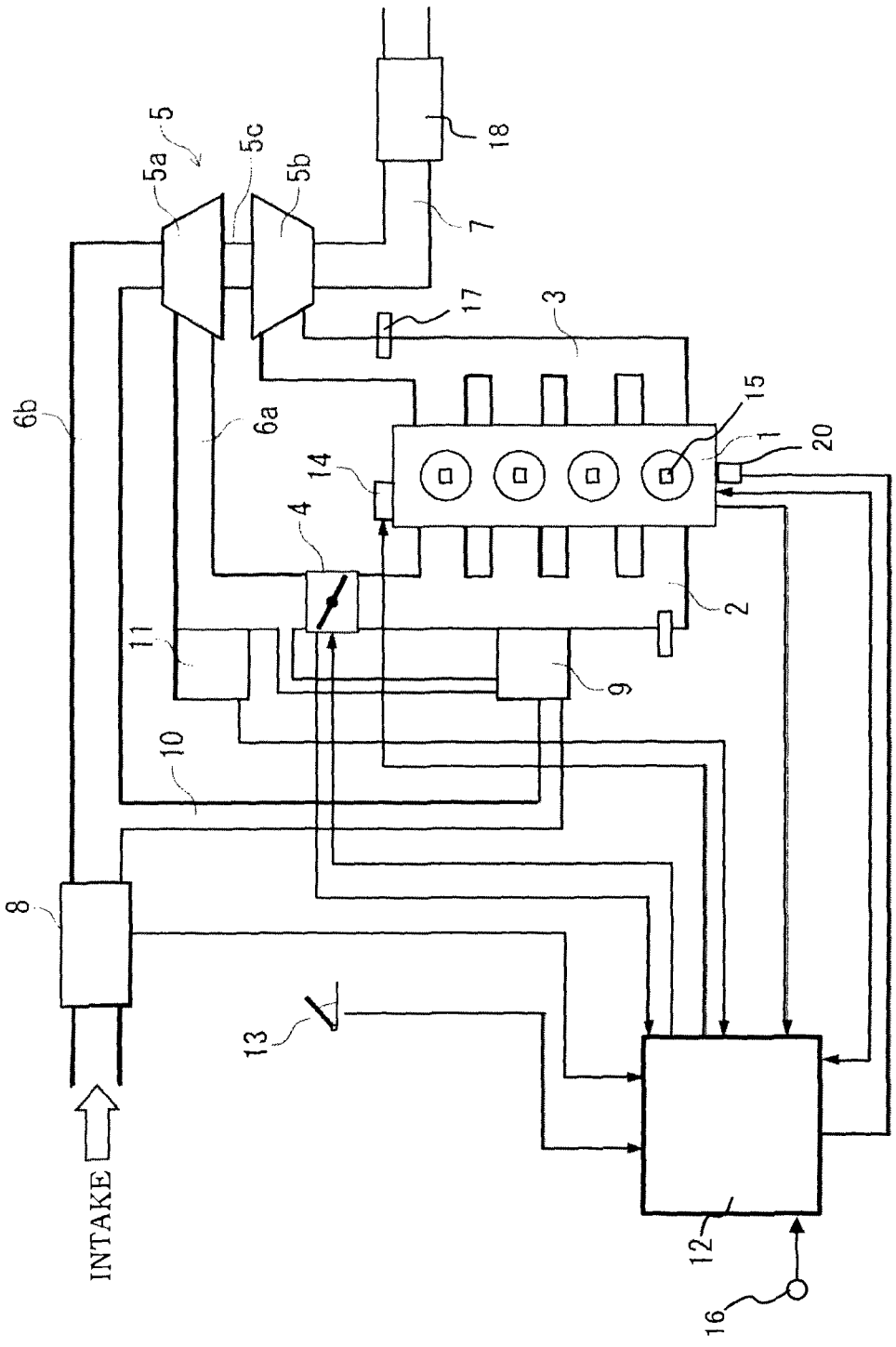
FIG. 1 is a configuration diagram of a system to which the present embodiment is applied.

FIG. 1 is a system configuration diagram of an internal combustion engine to which the present embodiment is applied.

A throttle chamber 4 for regulating the amount of air flowing into an internal combustion engine 1 is provided at the entrance of an intake manifold 2 of the internal combustion engine 1, and an intake passage 6 is connected to an upstream side of the throttle chamber 4. A compressor 5a of a supercharger 5 is installed upstream of the throttle chamber 4 in the intake passage 6, and an air flow meter 8 for detecting an intake air amount is installed upstream of the compressor 5a.

A fuel injection valve 15 for directly injecting fuel into a cylinder is arranged in each cylinder of the internal combustion engine 1. A turbine 5b of the supercharger 5 is installed in an exhaust passage 7.

The supercharger 5 is a so-called turbo-supercharger, and the compressor 5a and the turbine 5b are connected via a shaft 5c. Thus, when the turbine 5b is rotated by exhaust energy of the internal combustion engine 1, the compressor 5a rotates to feed intake air under pressure to a downstream side.

An exhaust catalyst 18 for exhaust purification is arranged downstream of the turbine 5b. For example, a three-way catalyst is used as the exhaust catalyst 18.

A recirculation passage 10 is a passage connecting an intake passage 6a and an intake passage downstream of the air flow meter 8 and upstream of the compressor 5a (hereinafter, referred to as an intake passage 6b). The both intake passages 6a, 6b communicate when a recirculation valve 9 disposed at an intermediate position of the recirculation passage 10 is opened and the communication is blocked when the recirculation valve 9 is closed.

Similarly to generally known ones, the recirculation valve 9 is opened when a differential pressure between a supercharging pressure and a pressure in the intake manifold 2 (hereinafter, referred to as an intake pipe pressure) becomes not smaller than a predetermined value. For example, a reaction force of a built-in spring is biased, for example, to a valve body provided inside in a valve closing direction. Further, the supercharging pressure acts in a valve opening direction of the valve body, the intake pipe pressure acts in the valve closing direction and the recirculation valve 9 is opened when the differential pressure between the supercharging pressure and the intake pipe pressure exceeds the reaction force of the spring. This can prevent the supercharging pressure from being excessively increased when the throttle chamber 4 is fully closed during running in a supercharged state. It should be noted that the differential pressure between the supercharging pressure and the intake pipe pressure when the recirculation valve 9 is opened can be set at an arbitrary value based on a spring constant of the spring.

A variable valve mechanism 14 suffices to change an intake valve closing timing (IVC) so as to create an overlap period during which both an exhaust valve and an intake valve are opened. For example, a generally known variable valve mechanism can be used such as the one for changing the rotational phase of an intake camshaft relative to a crankshaft or the one for changing an operating angle of the intake valve. It should be noted that a similar variable valve mechanism 14 may be provided also on the exhaust valve side to variably control valve timings of the intake valve and the exhaust valve.

A control unit 12 reads parameters relating to an operating state such as an intake air amount detected by the air flow meter 8, an accelerator pedal opening detected by an accelerator pedal opening sensor 13 and an engine rotation speed detected by a crank angle sensor 20 and controls an ignition timing, valve timings, an air-fuel ratio and the like based on these.

Next, a valve timing control and an air-fuel control performed by the control unit 12 are described.

The control unit 12 operates the variable valve mechanism 14 to provide such valve timings as to create a valve overlap period during which the intake valve and the exhaust valve are opened when the pressure in the intake manifold 2 is higher than that in an exhaust manifold 3.

This is for increasing the rotation speed of the turbine 5b and increasing filling efficiency into the cylinder, utilizing a so-called scavenging effect that fresh air flowing in from the intake manifold 2 directly moves across to the exhaust manifold 3 as scavenging gas during the valve overlap period.

Figure 2:
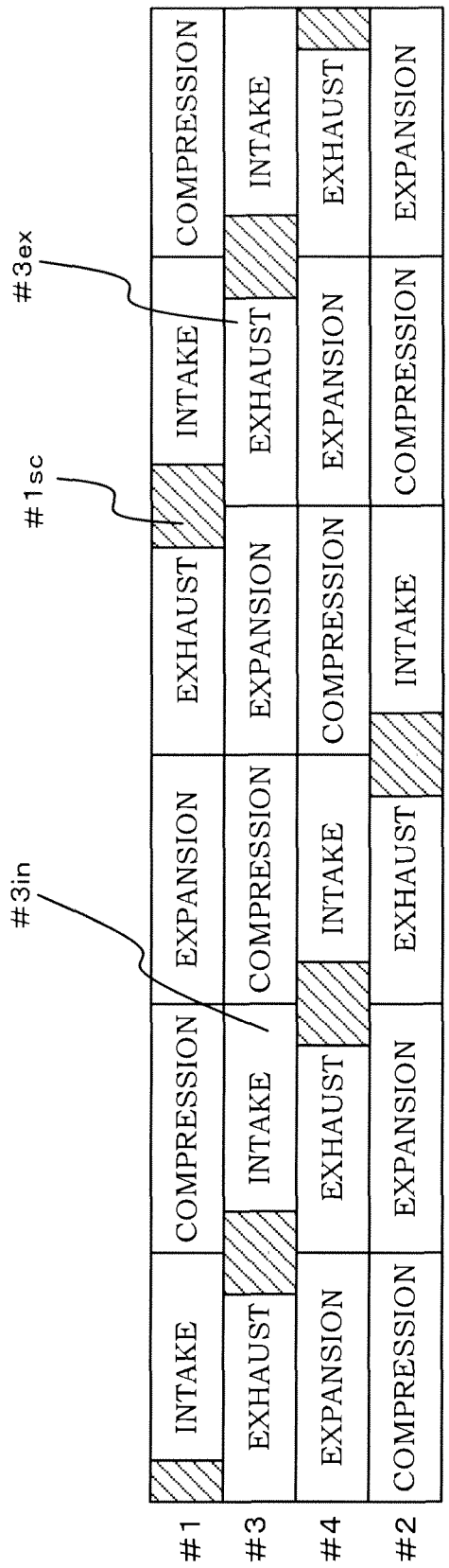

This effect is specifically described using FIG. 2. FIG. 2 shows a stroke sequence of an in-line four cylinder internal combustion engine in which the cylinders are ignited in the order of the first cylinder, the third cylinder, the fourth cylinder and the second cylinder. Hatched parts in FIG. 2 show valve overlap periods.

If the valve overlap periods are provided, exhaust gas exhausted from the cylinder during an exhaust stroke and scavenging gas in another cylinder during an intake stroke join in the exhaust manifold 3. For example, exhaust gas exhausted during an exhaust stroke #3ex of the third cylinder of FIG. 2 and scavenging gas scavenged during a valve overlap period #1sc of the first cylinder, which is in an intake stroke at that time, join.

Thus, the amount of the gas introduced to the turbine 5b is increased as compared with the case where there is no valve overlap period, i.e. there is no scavenging. This increases the rotation speed of the turbine 5b and increases the supercharging pressure by the compressor 5a. Further, since the gas remaining in the cylinder is also exhausted together with the fresh gas by scavenging, the filling efficiency of the fresh air into the cylinder is also consequently increased.

Further, in the present embodiment, energy for rotating the turbine 5b is increased by burning mixture gas of the exhaust gas and the scavenging gas joined in the exhaust manifold 3 before the mixture gas flows into the turbine 5b by the air-fuel ratio control to be described later.

Thus, a fuel injection amount is set to provide such an air-fuel ratio at which mixture gas of exhaust gas exhausted from a certain cylinder during the exhaust stroke and scavenging gas scavenged from the cylinder, which is in the intake stroke at the same time, during the valve overlap period is easy to burn before flowing into the turbine 5b. Specifically, such a fuel injection amount is set which provides an air-fuel ratio at which exhaust gas containing unburned hydrocarbon is exhausted and mixed with scavenging gas to become easy to burn by setting an air-fuel ratio in the cylinder to an air-fuel ratio richer than a theoretical air-fuel ratio, e.g. to provide a theoretic air-fuel ratio.

For example, in the case of setting a fuel injection amount for the amount of air sucked during an intake stroke #3in of the third cylinder of FIG. 2, such a fuel injection amount is set which provides an air-fuel ratio at which mixture gas of exhaust gas exhausted during the exhaust stroke #3ex of the third cylinder and scavenging gas exhausted during the valve overlap period #1sc of the first cylinder is easy to burn. That is, focusing on the air-fuel ratio in the third cylinder, this air-fuel ratio becomes richer than the theoretical air-fuel ratio and exhaust gas containing unburned fuel is exhausted during the exhaust stroke.

The fuel injection amount set as described above is such that all the fuel is injected by one fuel injection per stroke. A fuel injection timing is after the end of the valve overlap period during the intake stroke, i.e. after the closing of the exhaust valve or during a compression stroke. It should be noted that the air-fuel ratio control is described in detail later.

If being injected in this way, the fuel that becomes unburned hydrocarbon in the exhaust gas changes from high hydrocarbon having a long carbon chain to low hydrocarbon having a short carbon chain to increase combustibility by receiving combustion heat during an expansion stroke. Further, the air-fuel ratio in the cylinder becomes richer than the theoretical air-fuel ratio, thereby approaching an output air-fuel ratio, wherefore an output can be improved as compared with operation at the theoretical air-fuel ratio. Furthermore, the interior of the cylinder is cooled by latent heat of vaporization when the fuel vaporizes in the cylinder, which contributes to an improvement in filling efficiency.

FIG. 3 is a block diagram showing computation contents for setting the amount of fuel to be injected into the cylinder. It should be noted that this block diagram also includes the estimation of air-fuel ratios in the cylinders and the exhaust manifold 3, which is performed using the set fuel injection amount.

An in-exhaust pipe air-fuel ratio target value setting unit 301 sets an in-exhaust pipe target air-fuel ratio which is a target air-fuel ratio in the exhaust manifold 3. The target air-fuel ratio is set at an air-fuel ratio at which the mixture gas of the exhaust gas and the scavenging gas is easy to burn, e.g. at the theoretical air-fuel ratio.

It should be noted that, without being limited to the theoretical air-fuel ratio, the target air-fuel ratio may be set at such an air-fuel ratio at which the mixture gas of the exhaust gas and the scavenging gas satisfies a required value of exhaust performance, i.e. at which the conversion efficiency of the exhaust catalyst 18 is not reduced. Even in this case, filling efficiency in the cylinder is improved by the scavenging effect, a generated torque is increased and a reduction in exhaust performance can be prevented.

An in-cylinder trapped intake air amount estimation unit 302 estimates an in-cylinder trapped intake air amount, which is a part of the intake air amount trapped in the cylinder at the end of the intake stroke, based on the intake air amount detected by the air flow meter 8 and a scavenging rate. It should be noted that the scavenging rate means a value obtained by dividing the amount of fresh air by the amount of gas in the cylinder. A calculation method for the scavenging rate is described later.

A cylinder scavenging gas amount estimation unit 303 estimates a cylinder scavenging gas amount, which is a part of the intake air amount flowing out to the exhaust manifold 3 during the valve overlap period, based on the scavenging rate and the intake air amount for the cylinder that is in the intake stroke when the cylinder, for which the in-cylinder trapped intake air amount was calculated, is in the exhaust stroke.

An in-cylinder fuel injection amount setting unit 304 determines the amount of fuel to be injected into the cylinder based on the in-exhaust pipe target air-fuel ratio, the in-cylinder trapped intake air amount and the cylinder scavenging gas amount.

When the exhaust gas is mixed with the scavenging gas in the exhaust manifold 3, the air-fuel ratio of only a part to be diluted by the scavenging gas changes to a lean side. For example, if the fuel injection amount is set to provide the theoretical air-fuel ratio for the in-cylinder trapped intake air amount, the air-fuel ratio of the exhaust gas becomes the theoretical air-fuel ratio and becomes leaner than the theoretical air-fuel ratio when the exhaust gas is mixed with the scavenging gas in the exhaust manifold 3.

Accordingly, a hydrocarbon amount necessary to provide the in-exhaust pipe target air-fuel ratio when the exhaust gas is diluted by the scavenging gas is obtained based on the in-cylinder trapped intake air amount and the cylinder scavenging gas amount, and a fuel injection amount necessary to generate this amount of hydrocarbon is set based on the in-cylinder trapped intake air amount.

An in-cylinder air-fuel ratio estimation unit 305 estimates an air-fuel ratio in the cylinder from the fuel injection amount and the in-cylinder trapped intake air amount. An in-exhaust pipe air-fuel ratio estimation unit 306 estimates an air-fuel ratio in the exhaust manifold 3 from the in-cylinder air-fuel ratio and the cylinder scavenging gas amount. If the in-cylinder fuel injection amount is feedback-controlled based on these estimated values and the in-exhaust pipe target air-fuel ratio, the air-fuel ratio in the exhaust manifold 3 can be controlled with higher accuracy.

FIG. 4 is a block diagram of a control for judging whether or not to reduce the valve overlap period based on the in-cylinder air-fuel ratio estimated value obtained by the in-cylinder air-fuel ratio estimation unit 305. As the scavenging amount increases, the amount of fuel necessary to set the in-exhaust pipe air-fuel ratio to a desired air-fuel ratio also increases and, associated with this, the air-fuel ratio in the cylinder becomes richer. Accordingly, if the air-fuel ratio in the cylinder exceeds a combustion limit when the fuel injection amount obtained by the computation of FIG. 3 is set, a computation of FIG. 4 is performed to reduce the scavenging amount by shortening the valve overlap period.

An in-cylinder air-fuel ratio allowable value calculation unit 401 sets an in-cylinder air-fuel ratio allowable value obtained based on conditions such as the combustion limit. An in-cylinder air-fuel ratio estimation unit 402 reads the in-cylinder air-fuel ratio estimated by the in-cylinder air-fuel ratio estimation unit 305 of FIG. 3.

A determination unit 403 compares the in-cylinder air-fuel ratio allowable value and the in-cylinder air-fuel ratio estimated value and requests a VTC control unit 404, which is a control unit of the variable valve mechanism 14, to reduce the valve overlap period if the in-cylinder air-fuel ratio estimated value is determined to be richer. In this way, the valve overlap period is reduced to decrease the scavenging amount. That is, an upper limit value of the scavenging amount for satisfying a performance requirement is determined.

By the controls of FIGS. 3 and 4 described above, the air-fuel ratio of the mixture gas of the exhaust gas and the scavenging gas in the exhaust manifold 3 can be controlled to the air-fuel ratio at which the mixture gas is easy to burn and combustion stability in the cylinder can be ensured.

Next, the scavenging rate used to estimate the in-cylinder trapped intake air amount and the cylinder scavenging gas amount by referring to FIG. 3 is described.

FIG. 5 is a block diagram showing computation contents for calculating the scavenging rate.

The scavenging rate is determined, during a steady operation, based on the amount of heat generation obtained from the engine rotation speed and the intake air amount or the amount of gas passing in the exhaust manifold 3. However, a pressure loss occurs during a transient operation since an increase in the rotation speed of the turbine 5b is delayed relative to an increasing rate of the amount of gas flowing in the exhaust manifold 3. As a result, an exhaust pressure during the transient operation becomes higher than that during the steady operation at the same intake air amount and the same engine rotation speed. Accordingly, in the computation of FIG. 5, the scavenging rate is calculated by correcting the exhaust pressure during the steady operation with an increase or decrease of an exhaust pressure variation amount during the transient operation (hereinafter, referred to as a transient pressure variation).

A collector pressure reading unit 501 reads the pressure in the intake manifold 2 as a collector pressure. An exhaust pressure reading unit 502 reads an exhaust pressure obtained by a computation to be described later. A transient pressure variation reading unit 503 reads a transient exhaust pressure variation amount obtained by a computation to be described later.

An across-exhaust valve differential pressure calculation unit 504 calculates an across-exhaust valve differential pressure by subtracting the exhaust pressure from the collector pressure and adding the transient pressure variation to the resultant. In this way, the across-exhaust valve differential pressure including the transient exhaust pressure variation amount is calculated.

On the other hand, an engine rotation speed reading unit 505 reads the engine rotation speed based on a detected value of the crank angle sensor 20 and an overlap amount reading unit 506 reads a valve overlap amount obtained by a computation to be described later.

A scavenging rate calculation unit 507 computes the scavenging rate using a map set in advance based on the engine rotation speed, the valve overlap amount and the across-exhaust value differential pressure and a scavenging rate setting unit 508 reads that computation result as the scavenging rate. The map used here is such that a vertical axis represents the across-exhaust value differential pressure and a horizontal axis represents the valve overlap amount as shown in FIG. 5, and the control unit 12 stores a plurality of maps for each engine rotation speed.

FIG. 6 is a block diagram showing computation contents for obtaining the exhaust pressure to he read by the exhaust pressure reading unit 502. Since the exhaust pressure is largely affected by an atmospheric pressure and an exhaust temperature, the estimation accuracy of the exhaust pressure is increased and, consequently, the estimation accuracy of the scavenging rate is increased by making corrections based on these. Specifically, the following computation is performed.

An exhaust temperature reading unit 601 reads a detected value of an exhaust temperature sensor 17 and an intake air amount reading unit 602 reads a detected value of the air flow meter 8. A reference exhaust pressure calculation unit 603 calculates a reference exhaust pressure based on these read values, using a map prepared in advance. In this way, the exhaust pressure corresponding to the intake air amount and the exhaust temperature can be set as a reference value.

On the other hand, a reference atmospheric pressure reading unit 604 reads a detected value of an atmospheric pressure sensor 16 when the reference exhaust pressure is calculated. Further, an atmospheric pressure reading unit 605 reads the present detected value of the atmospheric pressure sensor 16. Then, an atmospheric pressure correction unit 606 computes the sum of a value obtained by subtracting the reference atmospheric pressure from the reference exhaust pressure and the atmospheric pressure, and an exhaust pressure calculation unit 607 reads the computation result as the exhaust pressure. In this way, the exhaust pressure corresponding to the atmospheric pressure can be estimated.

FIG. 7 is a block diagram for the calculation of the transient exhaust pressure variation amount to be read by the transient pressure variation reading unit.

Here, the transient exhaust pressure variation amount is calculated using the intake air amount and a change amount of the throttle valve opening as triggers for determining whether or not the transient operation is in process.

An intake air amount reading unit 701 reads a detected value of the air flow meter 8. A throttle valve opening reading unit 702 reads a throttle valve opening. The throttle valve opening may be detected by a throttle position sensor or an instruction value to an actuator for driving the throttle valve may be read in the case of an electronically controlled throttle.

An intake change rate calculation unit 703 calculates an intake change rate ΔQA, which is a change rate of the intake air amount, based on the intake air amount read by the intake air amount reading unit 701. An intake change rate correction value calculation unit 714 calculates a value obtained by adding a primary delay to the intake change rate ΔQA as an intake change rate correction value QMv by the following equation (1).

$$QMv = \Delta QA \times k + (1-k) \times QMvz \quad (1)$$

A transient exhaust pressure change amount estimation unit 711 calculates a transient exhaust pressure, which serves as a basis, from a map prepared in advance based on the intake change rate correction value QMv obtained as described above and inputs the calculation result to a switch unit 712.

An intake amount change amount calculation unit 704 calculates a change amount of the intake air amount and a first determination unit 708 compares a first transient determination criterion stored in advance in a first transient determination criterion setting unit 705 and the intake amount change amount.

A throttle valve opening change amount calculation unit 706 calculates a change amount of the throttle valve opening, and a second determination unit 709 compares a second transient determination criterion stored in advance in a second transient determination criterion setting unit 707 and the throttle valve opening change amount.

A third determination unit 710 reads the determination results of the first and second determination units 708, 709. At least either if the intake amount change amount is larger than the first transient determination criterion in the first determination unit 708 or if the throttle valve opening change amount is larger than the second transient determination criterion in the second determination unit 709, it is determined that the transient operation is in process. This determination result is input to the switch unit 712, which is switched to a side where a transient exhaust pressure variation is added when the transient operation is in process and switched to a side where the transient exhaust pressure variation amount is not added when the transient operation is not in process. A transient exhaust pressure variation deciding unit 713 sets a value output from the switch unit 712 as the transient exhaust pressure variation amount.

FIG. 8 is a flow chart showing a control routine executed by the control unit 12 for deciding the conversion angle of the variable valve mechanism 14. The valve overlap period is calculated during this control.

In Step S801, the control unit 12 reads the operating state of the internal combustion engine 1 such as the collector pressure, the engine rotation speed, the intake temperature, the atmospheric pressure and a basic injection pulse. The basic injection pulse is a value correlated to an output of the internal combustion engine 1.

In Step S802, the control unit 12 calculates a scavenging amount upper limit value obtained from the above operating state. Here, an example of a method for obtaining the scavenging amount upper limit value is described.

FIG. 9 is a block diagram for the calculation of the scavenging amount upper limit value based on the catalyst temperature.

When the fuel is so injected that the air-fuel ratio in the exhaust manifold 3 including scavenging air becomes the theoretical air-fuel ratio and the mixture gas of the exhaust gas and the scavenging gas is burned in the exhaust manifold 3, the higher the combustion energy, the higher the efficiency of the supercharger 5. Further, the higher the scavenging rate, the higher the ratio of fresh air in the cylinder and the higher the filling efficiency. That is, to satisfy performance requirements such as an output improvement for the internal combustion engine 1, the scavenging amount is better to be as large as possible. However, since the valve overlap period is limited by conditions such as the combustion limit as shown in FIG. 4, the upper limit of the scavenging amount is also limited.

On the other hand, as the scavenging amount increases, the exhaust catalyst 18 is heated up to a higher temperature by the combustion in the exhaust manifold 3. Since the exhaust purification performance of the exhaust catalyst 18 is deteriorated if the temperature excessively increases, it is necessary to set an upper limit value of the scavenging amount to suppress a temperature increase of the exhaust catalyst 18.

Accordingly, the scavenging amount is limited to such an extent as not to prevent the deterioration of the exhaust catalyst 18 and this is set as the scavenging amount upper limit value.

It should be noted that a collector pressure Boost, an engine rotation speed NE, a basic injection pulse TP, an intake temperature TAN and an atmospheric pressure PAMB are read as the operating state.

A catalyst upper limit temperature calculation unit 901 calculates a catalyst upper limit temperature, which is an upper limit temperature of the exhaust catalyst 18 determined according to the operating state.

Similarly, a no-scavenging catalyst upper limit temperature calculation unit 902 calculates a no-scavenging catalyst estimated temperature, which is an estimated temperature of the exhaust catalyst 18 in a normal operating state where there is no scavenging, i.e. in an operating state where the mixture gas of the scavenging gas and the exhaust gas is not burned.

A during-scavenging catalyst temperature increase allowable value calculation unit 903 calculates a during-scavenging catalyst temperature increase allowable value, which is a difference between the catalyst upper limit temperature and the no-scavenging catalyst estimated temperature. The temperature of the exhaust catalyst 18 during the scavenging is allowed to increase by this during-scavenging catalyst temperature increase allowable value.

A catalyst temperature allowing scavenging amount calculation unit 905 calculates a catalyst temperature allowing scavenging amount, which is the scavenging amount upper limit value determined from the temperature of the exhaust catalyst 18 using a map prepared in advance, from the during-scavenging catalyst temperature increase allowable value and the air-fuel ratio in the cylinder of the internal combustion engine 1 obtained by an in-cylinder air-fuel ratio calculation unit 904. The map used here shows a relationship between the scavenging amount and the catalyst temperature increase amount for each air-fuel ratio in the cylinder.

Then, a catalyst temperature allowing scavenging amount deciding unit 906 sets the calculation result, which is the catalyst temperature allowing scavenging amount, as the scavenging amount upper limit value.

In the case of deciding the scavenging amount upper limit value based on the operating state of the internal combustion engine 1 such as the engine rotation speed and an environment in which the internal combustion engine 1 operates such as the intake temperature and the atmospheric pressure as described above, the calculation result of the no-scavenging catalyst upper limit temperature calculation unit 902 differs according to the operating state and the environment. As a result, the catalyst temperature allowing scavenging amount is also a value corresponding to the operating state and the environment.

Further, if values presuming the state of the next cycle are used as the engine rotation speed and the like to be input in the computation of FIG. 9, the scavenging amount upper limit value in the next cycle can be obtained. Accordingly, even a control during the transient operation in which a feed-forward control is required can be dealt with by similarly calculating the scavenging amount upper limit value after a predetermined time.

FIG. 8 is further described.

In Step S802 of FIG. 8, the control unit 12 also calculates the scavenging amount upper limit value that satisfies the performance requirements determined by the computation of FIG. 4 in addition to the catalyst temperature allowing scavenging amount. The smaller one of these is set as the scavenging amount upper limit value. In Step S803 of FIG. 8, the control unit 12 decides the valve overlap period based on the scavenging amount obtained in Step S802. If the scavenging amount and the valve overlap period are obtained in advance according to the specification of the applied internal combustion engine, the valve overlap period can be easily set based on the scavenging amount. Then, the overlap amount reading unit 506 of FIG. 5 reads this value.

In Step S804, the control unit 12 decides the conversion angle of the variable valve mechanism 14 for realizing the valve overlap period decided in Step S803. If a relationship between the valve overlap period and the conversion angle is obtained in advance according to the profiles of an intake cam and an exhaust cam of the applied internal combustion engine 1 and the like, the conversion angle can be easily decided according to the valve overlap period.

If the fuel injection amount is set by the computation of FIG. 3 as described above, the mixture gas of the scavenging gas and the exhaust gas mixed in the exhaust manifold 3 can be controlled to have an air-fuel ratio at which the mixture gas is easy to burn.

It should be noted that although the present embodiment has been described with respect to the case where the internal combustion engine 1 is of an in-cylinder direct injection type, there is no limitation to this and application to a so-called port injection type internal combustion engine in which fuel is injected into an intake port communicating with each cylinder is also possible. In the case of a port injection type internal combustion engine, if the fuel is injected after the end of the valve overlap period, i.e. after the closing of the exhaust valve, the injected fuel is not exhausted to the exhaust manifold 3 together with the scavenging gas. Thus, the aforementioned method for setting the fuel injection amount can be applied as it is.

In FIG. 3, the cylinder scavenging gas amount estimation unit 303 estimates the cylinder scavenging gas amount for the cylinder that is in the intake stroke when the cylinder, for which the in-cylinder trapped intake air amount was calculated, is in the exhaust stroke. This is to deal also with the transient operation state. However, in the case of the steady operation, both the in-cylinder trapped intake air amount and the cylinder scavenging gas amount are the same in each cylinder. Thus, the fuel injection amount can be also determined using the cylinder scavenging gas amount of the same cylinder as the one for which the in-cylinder trapped intake air amount was calculated.

In the above manner, the following effects are obtained in the present embodiment.

Since the control unit 12 sets the scavenging amount for satisfying the performance requirements for the internal combustion engine 1 and controls the duration of the valve overlap period according to this scavenging amount, a ratio of fresh air in the cylinder, i.e. filling efficiency is improved by scavenging.

Since the control unit 12 limits the scavenging amount upper limit value based on the estimated temperature of the exhaust catalyst 18, the temperature of the exhaust catalyst 18 can be prevented from being excessively increased when the scavenging gas is mixed with the exhaust gas and burned in the exhaust manifold 3.

Since the control unit 12 limits the scavenging amount upper limit value based on the operating state and the placed environment of the internal combustion engine 1, an appropriate scavenging amount upper limit value can he set. Specifically, if the operating state and the placed environment are different, the intake air amount, the exhaust temperature and the like are also different, and the catalyst temperature increase allowing scavenging amount calculated based on these is also different. However, an appropriate scavenging amount upper limit value can be set by the control.

For example, since the turbo-supercharger 5 more easily rotates when air pressure is low, the rotation speed is more likely to increase even at the same scavenging amount and may undergo excessive rotation as compared with the case where air pressure is high. In this case, the supercharger 5 can be protected by suppressing the excessive rotation if a part of the exhaust air is bypassed by a wastegate or the like, but this causes the exhaust gas and energy generated by the combustion of the exhaust gas to be wasted. Thus, if the scavenging amount upper limit value is set based on the placed environment of the internal combustion engine 1, the scavenging amount can be set not to cause excessive rotation and the supercharger 5 can be protected without wasting energy.

The control unit 12 sets the scavenging amount upper limit value based on a scavenging unexecuted state estimated based on the operating state and a state after the execution of scavenging estimated based on the target air-fuel ratio in the cylinder. That is, since the catalyst temperature allowing scavenging amount is set based on the temperature in the exhaust manifold 3 determined by the operating state such as the intake temperature and a temperature increase caused by burning the mixture gas of the scavenging gas and the exhaust gas, an appropriate scavenging amount upper limit value can be set.

The control unit 12 sets the upper limit value of the scavenging amount based on the scavenging unexecuted state after the elapse of a predetermined time estimated based on an operating state estimated value, e.g. after one cycle and a state after the execution of scavenging estimated based on the target air-fuel ratio in the cylinder. That is, the scavenging amount upper limit value of the next cycle can be set by inputting values estimating the state of the next cycle such as the engine rotation speed and the load. An appropriate scavenging amount upper limit value can be set also during the transient operation, for which the feed-forward control is required, such as during acceleration.

Since the control unit 12 selects a smallest scavenging amount upper limit value when a plurality of scavenging amount upper limit values are calculated based on a plurality of conditions, a reduction in system performance can be reliably prevented.

(Second Embodiment)

Next, a second embodiment is described.

A system to which the present embodiment is applied is similar to the first embodiment. The control is basically the same, but differs in calculating a scavenging amount upper limit value based on a NOx generation amount. Accordingly, a method for calculating the scavenging amount upper limit value is described.

Since no fuel is contained in scavenging gas that moves from an intake passage across to an exhaust passage in the case of an in-cylinder direct injection type internal combustion engine, an air-fuel ratio of gas flowing into an exhaust catalyst 18 is shifted to a lean side as a scavenging amount increases. If the air-fuel ratio in the exhaust catalyst 18 becomes leaner than a theoretical air-fuel ratio, NOx conversion efficiency is deteriorated and NOx, which are flowing into, cannot be treated any longer, whereby exhaust performance may be deteriorated.

Accordingly, a scavenging amount upper limit value is so set as not to generate NOx which cannot be treated by the exhaust catalyst 18.

FIG. 10 is a block diagram showing operation contents performed by a control unit 12 in this embodiment for setting the scavenging amount upper limit Value based on the NOx generation amount.

A NOx generation amount calculation unit 1001 reads an engine rotation speed NE and a basic injection pulse TP and calculates a NOx generation amount (during-scavenging NOx emission allowable value) allowable in this operating state by searching a map based on these. The NOx generation amount mentioned here means an amount exhausted from an internal combustion engine 1.

A vertical axis of the map used in the NOx generation amount calculation unit 1001 represents a collector pressure Boost. The basic injection pulse TP is determined according to a cylinder intake air mass and correlated to the collector pressure Boost. Accordingly, in searching the map, the read basic injection pulse TP is converted into the collector pressure Boost based on the above correlation relationship. It should be noted that the collector pressure Boost may be directly read.

An in-cylinder air-fuel ratio reading unit 1002 reads an in-cylinder air-fuel ratio estimated by the in-cylinder air-fuel ratio estimation unit 305 of FIG. 3.

A scavenging amount calculation unit 1003 calculates a scavenging amount allowable in this operating state by searching a map prepared in advance and showing a relationship between the scavenging amount and the NOx generation amount for each in-cylinder air-fuel ratio, using the NOx generation amount calculated by the NOx generation amount calculation unit 1001. This scavenging amount is referred to as a NOx generation allowing scavenging amount.

A NOx generation allowing scavenging amount setting unit 1004 sets the NOx generation allowing scavenging amount as a scavenging amount upper limit value.

By setting the scavenging amount upper limit value as described above, a deterioration in the NOx conversion efficiency of the exhaust catalyst 18 can be prevented in the case of burning mixture gas of scavenging gas and exhaust gas in an exhaust manifold 3.

Further, if the scavenging amount upper limit value is determined based on the operating state of the internal combustion engine 1 such as an engine rotation speed and the operating environment of the internal combustion engine 1 such as an intake temperature and an atmospheric pressure as described above, the calculation result of the NOx generation amount calculation unit 1001 differs depending on the operating state and the environment. As a result, the NOx generation allowing scavenging amount is also a value corresponding to the operating state and the environment.

In the above manner, in the present embodiment, the following effect is further obtained in addition to effects similar to those of the first embodiment.

Since the control unit 12 limits the scavenging amount upper limit value based on an estimated value of a NOx emission amount from the internal combustion engine 1 to the exhaust manifold 3, a reduction in the NOx conversion efficiency of the exhaust catalyst 18 caused by scavenging can be prevented.

(Third Embodiment)

Next, a third embodiment is described.

The present embodiment relates to a control when a torque requirement suddenly increases such as during acceleration in a system similar to those of the first embodiment and the like. Although a basic control is similar to that of the first embodiment, the setting of the scavenging amount upper limit value performed in Step S802 of FIG. 8 differs. The setting of a scavenging amount upper limit value is described below.

FIG. 11 is a block diagram showing operation contents for setting the scavenging amount upper limit value. Here, in principle, the smaller scavenging amount of a catalyst temperature allowing scavenging amount and a NOx generation allowing scavenging amount is set as the scavenging amount upper limit value. However, when a torque required value for the internal combustion engine 1 suddenly increases such as during sudden acceleration, a switch is made to a larger scavenging amount upper limit value prioritizing it to satisfy a torque requirement within such a range as not to negatively affect the system such as the internal combustion engine 1 and the supercharger 5 shown in FIG. 1.

If the scavenging amount upper limit value is increased in this way, energy when mixture gas of scavenging gas and exhaust gas is burned in the exhaust manifold 3 increases, with the result that a rotation increasing rate of the turbine 5b increases. Thus, the torque responsiveness of the internal combustion engine 1 increases.

Operation blocks 1101 to 1104 and operation blocks 1105 to 1108 of FIG. 11 are not described since they are respectively the same contents as FIGS. 9 and 10.

A minimum value selection unit 1109 selects the smaller one of the catalyst temperature allowing scavenging amount and the NOx generation allowing scavenging amount and inputs the result to a switch 1113.

A torque change rate determination unit 1110 determines whether or not a change rate of the torque required value for the internal combustion engine 1 is in excess of a preset threshold value, for example, based on an acceleration pedal opening change amount or the like. The threshold value is a value for determining whether or not it is necessary to prioritize the torque responsiveness over the catalyst temperature and the NOx generation amount, which is set in advance for each vehicle type to which the present control is applied.

If the torque required value change rate is in excess of the threshold value, a timer 1111 is operated and the switch 1113 is switched to a torque pickup allowing scavenging amount side to be described later only during a preset timer operation period. Although the timer operation period can be arbitrarily set, it is set to be shorter as a torque pickup allowing scavenging amount to be described later increases to prevent an adverse effect on the system.

A torque pickup allowing scavenging amount setting unit 1112 sets the torque pickup allowing scavenging amount, which is a scavenging amount upper limit value in the case of prioritizing the torque responsiveness, based on the operating state and the operating environment of the internal combustion engine 1.

A value which does not cause a performance reduction of the exhaust catalyst 18, the supercharger 5 and the like during the operation period of the timer 1111 even if the scavenging amount is maintained is set as the torque pickup allowing scavenging amount. That is, a normal scavenging amount upper limit value is a level which does not cause a performance reduction even during the steady operation, whereas the torque pickup allowing scavenging amount is a temporarily allowable level.

Specifically, since the torque pickup allowing scavenging amount changes according to the specifications of the internal combustion engine 1 and the exhaust catalyst 18, the length of the exhaust passage and the like, the torque pickup allowing scavenging amount for each operating state and each operating environment is formulated into a map in advance and this is searched. For example, the torque pickup allowing scavenging amount is set at a value which is larger than the catalyst temperature allowing scavenging amount and the NOx generation allowing scavenging amount and able to ensure combustion stability.

A scavenging amount upper limit value setting unit 1114 sets the scavenging amount selected by the switch 1113 as the scavenging amount upper limit value.

As described above, the control unit 12 calculates the scavenging amount upper limit value based on each of performance requirements for the internal combustion engine 1 such as the torque requirement and each of limiting conditions such as the catalyst temperature and the NOx generation amount. The torque pickup allowing scavenging amount is selected from the plurality of scavenging amount upper limit values if the torque required value change rate is in excess of the threshold value such as during sudden acceleration, and the smaller one of the scavenging amount upper limit values based on the limiting conditions is selected in other cases.

Since the smaller one of the scavenging amount upper limit values based on the limiting conditions is selected during the steady operation state, the largest scavenging amount within the range not to affect the system is set.

On the other hand, if the torque requirement has suddenly increased such as during acceleration, the scavenging amount upper limit value larger than the scavenging amount based on the limiting conditions is set only during a certain period. That is, the upper limit value of the scavenging amount is raised only during the certain period. This causes energy supplied to the turbine 5b to be increased, with the result that the torque responsiveness increases.

In the above manner, in the present embodiment, the following effect is further obtained in addition to effects similar to those of the first embodiment.

When the torque requirement suddenly increases, the control unit 12 increases the scavenging amount. Since this causes an increase in combustion energy in the exhaust manifold 3, i.e. energy supplied to the turbine 5b, the torque responsiveness of the internal combustion engine 1 is improved.

When the torque requirement suddenly increases, the control unit 12 relaxes the scavenging amount upper limit value only during the certain period, wherefore a reduction in system performance can be prevented while the torque responsiveness is improved.

Although the embodiments of the present invention have been described above, the above embodiments are merely illustration of some of application examples of the present invention and not intended to limit the technical scope of the present invention to the specific configurations of the above embodiments.

The present application claims a priority based on Japanese Patent Application No. 2011-24132 filed with the Japan Patent Office on Feb. 7, 2011, all the contents of which are hereby incorporated by reference.

The invention claimed is:

1. A control device for an internal combustion engine with a turbo-supercharger including a variable valve mechanism comprising:

an exhaust combustion controller configured to increase energy for rotating a turbine of the turbo-supercharger by burning mixture gas of exhaust gas and scavenging gas at an upstream side of the turbo-supercharger;

a temperature estimating controller configured to estimate the temperature of an exhaust catalyst provided in an exhaust passage;

a scavenging amount setting controller configured to set a scavenging amount based on an upper limit temperature of the exhaust catalyst and an estimated temperature of the exhaust catalyst;

a variable valve controller configured to control the duration of a valve overlap period according to the scavenging amount, an emission estimating controller configured to estimate a NOx emission amount exhausted from the internal combustion engine to the exhaust passage;

wherein the scavenging amount setting controller is further configured to calculate the scavenging amount based on an estimated value of the NOx emission amount and set the smaller one of the scavenging amount based on the estimated value of the NOx emission amount and the scavenging amount calculated based on the upper limit temperature of the exhaust catalyst and the estimated temperature of the exhaust catalyst as the scavenging amount.

2. The control device for the internal combustion engine with the turbo-supercharger according to claim 1, wherein:
the estimated temperature of the exhaust catalyst is an estimated temperature in an operating state where there is no scavenging.

3. The control device for the internal combustion engine with the turbo-supercharger according to claim 1, wherein:
the scavenging amount setting controller is configured to calculate the scavenging amount based on an operating state of the internal combustion engine and an environment in which the internal combustion engine is placed.

4. A control device for an internal combustion engine with a turbo-supercharger including a variable valve mechanism comprising:

a performance requirement detector configured to detect a performance requirement for the internal combustion engine;

a scavenging amount setting controller configured to determine an upper limit value of a scavenging amount moving from an intake passage to an exhaust passage across the interior of a cylinder during a valve overlap period to satisfy the performance requirement;

a variable valve controller configured to control the duration of the valve overlap period according to the upper limit value of the scavenging amount;

an operating state detector configured to detect an operating state of the internal combustion engine;

a target air-fuel ratio setting controller configured to set a target air-fuel ratio in the cylinder;

wherein the scavenging amount setting controller is configured to set the upper limit value of the scavenging amount based on a scavenging unexecuted state estimated based on the operating state and a state after the execution of scavenging estimated based on the target air-fuel ratio an emission estimating controller configured to estimate a NOx emission amount exhausted from the internal combustion engine to the exhaust passage;

wherein the scavenging amount setting controller is further configured to calculate the scavenging amount based on an estimated value of the NOx emission amount and set the smaller one of the scavenging amount based on the estimated value of the NOx emission amount and the scavenging amount calculated based on the upper limit temperature of the exhaust catalyst and the estimated temperature of the exhaust catalyst as the scavenging amount.

5. The control device for the internal combustion engine with the turbo-supercharger according to claim 4, further comprising:

an operating state estimating controller configured to estimate the operating state of the internal combustion engine after the elapse of a predetermined time;

wherein the scavenging amount setting controller is configured to set the upper limit value of the scavenging amount based on the scavenging unexecuted state after the elapse of the predetermined time estimated based on an operating state estimated value and the state after the execution of scavenging estimated based on the target air-fuel ratio.

6. The control device for the internal combustion engine with the turbo-supercharger according to claim 1, wherein:

the scavenging amount setting controller is configured to increase the scavenging amount when an increasing rate of a torque requirement for the internal combustion engine exceeds a preset threshold value.

7. The control device for the internal combustion engine with the turbo-supercharger according to claim 1, wherein:

the scavenging amount setting controller is configured to increase the scavenging amount only during a certain period when an increasing rate of a torque requirement for the internal combustion engine exceeds a preset threshold value.

8. The control device for the internal combustion engine with the turbo-supercharger according to claim 4, wherein:

the scavenging amount setting controller is configured to increase the scavenging amount when an increasing rate of a torque requirement for the internal combustion engine exceeds a preset threshold value.

9. The control device for the internal combustion engine with the turbo-supercharger according to claim 4, wherein:

the scavenging amount setting controller is configured to increase the scavenging amount only during a certain period when an increasing rate of a torque requirement for the internal combustion engine exceeds a preset threshold value.

10. A control device for an internal combustion engine with a turbo-supercharger including a variable valve mechanism, comprising:

an exhaust combustion means for increasing energy for rotating a turbine of the turbosupercharger by burning mixture gas of exhaust gas and scavenging gas at an upstream side of the turbo-supercharger;

a means for estimating the temperature of an exhaust catalyst provided in an exhaust passage;

a scavenging amount setting means for setting a scavenging amount based on an upper limit temperature of the exhaust catalyst and an estimated temperature of the exhaust catalyst; a variable valve control means for controlling the duration of a valve overlap period according to the scavenging amount;

an emission estimating control means for estimating a NOx emission amount exhausted from the internal combustion engine to the exhaust passage; and wherein the scavenging amount setting means is further for calculating the scavenging amount based on an estimated value of the NOx emission amount and setting the smaller one of the scavenging amount based on the estimated value of the NOx emission amount and the scavenging amount calculated based on the upper limit temperature of the exhaust catalyst and the estimated temperature of the exhaust catalyst as the scavenging amount.

* * * * *